Oct. 14, 1930.                M. F. CARR                1,778,703
                         SEPARABLE FASTENER
                         Filed Aug. 25, 1928
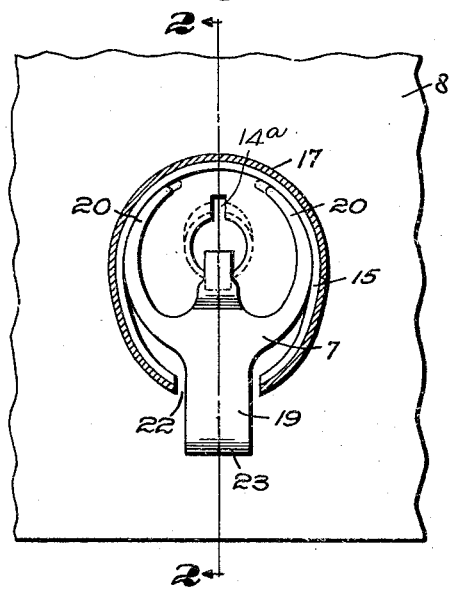
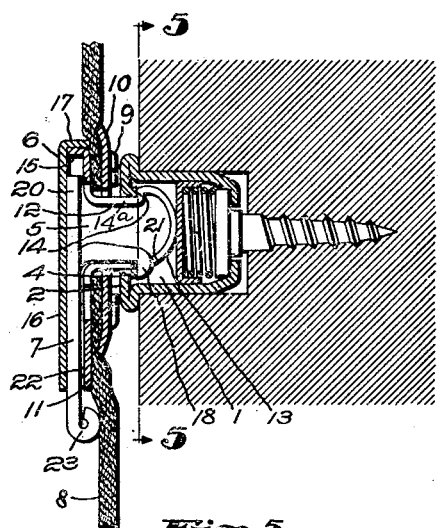
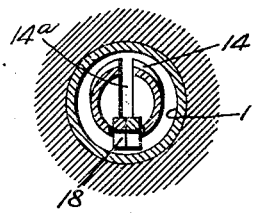
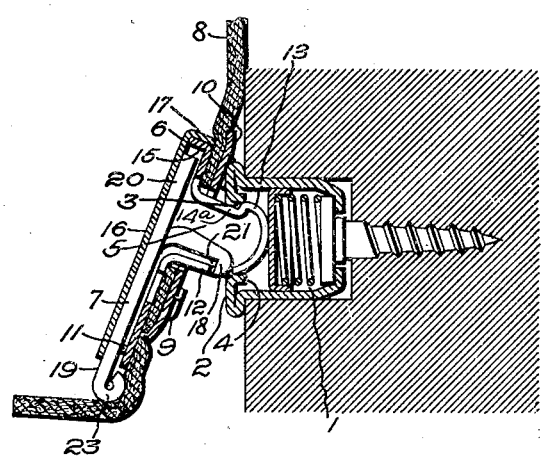
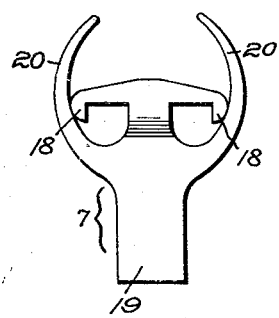
Inventor:
Moses F. Carr.
by Emery, Booth, Janney & Varney
        Attys.

Patented Oct. 14, 1930

1,778,703

UNITED STATES PATENT OFFICE

MOSES F. CARR, OF LEXINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE FASTENER

Application filed August 25, 1928. Serial No. 301,984.

My invention aims to provide improvements in separable fasteners.

In the drawings which illustrate a preferred embodiment of my invention:—

Figure 1 is a front elevation of the stud member attached to its carrying medium with the front face of the casing portion broken away to show the manipulatory means of the stud unit;

Fig. 2 is a section taken on the line 2—2 showing the stud engaged with a socket, portions of the stud and socket being shown in elevation;

Fig. 3 is a section similar to the one shown in Fig. 2, but showing the stud in the act of being separated from the socket;

Fig. 4 is a view of the manipulatory element of the stud member illustrating the manner in which it is formed from a single piece of sheet metal; and Fig. 5 is a section taken on the line 5—5 of Fig. 2 to illustrate the shoulder of the stud member and the latch which provide the means for securing the stud and socket together.

Referring to the drawings, I have illustrated a three-side lock fastener of the flush type which includes a socket countersunk into a rigid support and a stud secured to a flexible support. I use the term "three-side lock fastener" because the fastener is locked against separation by stresses exerted upon the flexible support at three sides of the stud, while the fastener may be separated by a pull exerted upon the flexible support at the fourth side of the fastener. The fastener may be used in any suitable manner, as, for instance, for securing a curtain to the body of a motor vehicle or the like.

The socket 1, which I have illustrated in Figs. 2 and 3, is of a construction substantially the same as illustrated and described in United States Letters Patent No. 1,625,406 issued to Carr Fastener Company, assignee of Andrew G. Anderson.

The socket illustrated includes a casing having a front face 2 through which is provided a stud-receiving aperture 3 surrounded by a wall 4 of substantial width.

My preferred form of stud unit comprises a socket-engaging portion 5, a casing portion 6 and a manipulatory means 7 all secured together as a unit, as shown in Fig. 2. The unit may be attached to the flexible carrying medium 8 by means of attaching prongs 9 passing through the carrying medium and through a back plate 10 against which they are clenched. The socket-engaging portion has a base 11 from which is pressed a hollow shank 12 having at its outer end a head 13 offset at one side of the shank to provide a relatively abrupt shoulder 14 while being substantially flush with the shank 12 at the opposite side from the greatest offset portion. The shank and head portions of the socket-engaging portion are divided by a slit 14$^a$ (Figs. 2 and 5) which terminates in the base 11, thereby to permit contraction and expansion of the head of the stud when engaged with or disengaged from a socket.

An upstanding peripheral wall 15 is provided at the edge of the base 12 to space a front plate 16 from the base 12, as shown in Figs. 2 and 3. This front plate 16 is secured to the socket-engaging portion by means of a wall 17 clenched against the upstanding wall 15. Thus, the base of the socket-engaging portion, together with the front plate 16, forms the casing portion of the stud assembly.

The manipulatory unit which forms a part of the stud assembly is formed from a single piece of metal, as shown in Fig. 4, and includes the latch 18, formed of double thickness of metal, as shown in Fig. 5, the finger piece 19 and the spring portions 20—20. When the manipulatory unit is assembled with the stud, as shown in Figs. 2 and 3, the latch 18 extends through a slot 21 (Figs. 2 and 5) at that side of the shank opposite the greatest offset portion of the head and the finger portion 19 extends laterally outwardly from the casing through a slot at 22 formed in the walls 15 and 17, as shown in Figs. 1 and 2. The spring portions 20—20 conform substantially with and contact with the wall 12 in the upper portion of the casing, as shown in Fig. 1, so that when the finger piece is moved laterally toward the shank of the stud unit the spring portions will yield curvilinearly so that the latch may be moved into the shank.

The dotted positions of the ends of the spring portions are indicated in Fig. 1.

When securing the stud and socket together it is merely necessary to enter the head of the socket-engaging part into the aperture of the socket and press upon the front plate of the casing. This action squeezes the yieldable portions of the head together and forces the latch 18 into the shank to permit the head to pass by the wall 4 surrounding the stud-receiving aperture 3. Then, as the shoulder 14 and the latch 18 pass by the inner edge of the wall 4, the head expands and permits the shoulder 14 to engage behind the wall and the spring portions 20—20 urge the latch 18 through the slot 21 so that the latch engages behind the wall, all as shown in Fig. 2.

In the position shown in Fig. 2 the fastener members are secured against accidental separation by any lateral stresses exerted upon the flexible carrying medium 8, or any outward stresses exerted upon the carrying medium 8 at three sides of the stud unit. Therefore, the fastener may be separated only by lateral movement of the finger portion 19 of the manipulatory unit 7 which I prefer to bring about by a pull on the lower edge of the carrying medium 8. An outward pull on the carrying medium 8 swings it into the position shown in Fig. 3 so that it contacts with the rounded end 23 of the finger portion 19 thereby thrusting the manipulatory unit 7 as a whole laterally to draw the latch 18 into the shank 12 of the socket-engaging portion against the pressure of the spring portions 20—20 so that the stud may be tipped about a contact point between the wall 4 of the socket and the shoulder 14, as shown in Fig. 3. A continued pull on the carrying medium will contract the head 13 of the socket-engaging portion and thereby release the stud from the socket.

While I have illustrated and described one embodiment of my invention, I do not wish to be limited thereby, as the scope of my invention is best defined in the following claims.

Claims:

1. A separable fastener comprising, in combination, a socket presenting a stud-receiving aperture surrounded by a stud-engaging wall, a cooperating stud having a shank secured to a carrying medium and adapted for engagement with said wall, a head at one end of said shank offset toward one side of said shank to provide a shoulder for retaining the shank with the socket, a latch extending through a slot at one side of said shank to engage the wall of the said socket and prevent separation of the fastener by stresses exerted laterally relative to the carrying medium and means operatively connected with the latch and located adjacent to the carrying medium as a part of the stud assembly for drawing the latch into the shank to permit separation of the fastener.

2. A separable fastener comprising, in combination, a socket presenting a stud-receiving aperture surrounded by a stud-engaging wall, a cooperating stud having a shank secured to a carrying medium and adapted for engagement with said wall, a head at one end of said shank offset towards one side of said shank to provide a shoulder for retaining the shank with the socket, a slot dividing said shank and said head to permit contraction and expansion of said head, a latch extending through a slot at one side of said shank to engage the wall of the said socket and prevent separation of the fastener by stresses exerted laterally relative to the carrying medium and means operatively connected with the latch and located adjacent to the carrying medium as a part of the stud assembly for drawing the latch into the shank to permit separation of the fastener.

3. A separable fastener comprising, in combination, a socket presenting a stud-receiving aperture surrounded by a stud-engaging wall, a cooperating stud having a shank secured to a carrying medium and adapted for engagement with said wall, a head at one end of said shank offset toward one side of said shank to provide a shoulder for retaining the shank with the socket, a latch extending through a slot at one side of said shank opposite to the offset portion of said head to engage the wall of the said socket and prevent separation of the fastener by stresses exerted laterally relative to the carrying medium and means operatively connected with the latch and located adjacent to the carrying medium as a part of the stud assembly for drawing the latch into the shank to permit separation of the fastener.

4. A separable fastener comprising, in combination, a socket presenting a stud-receiving aperture surrounded by a stud-engaging wall, a cooperating stud having a shank secured to a carrying medium and adapted for engagement with said wall, a head at one end of said shank offset toward one side of said shank to provide a shoulder for retaining the shank with the socket, a latch extending through a slot at that side of said shank opposite the offset portion of said head for engagement with the edge of said wall of said socket to assist in locking the fastener against separation by stresses exerted on the carrying medium at three sides of the stud, a latch-operating piece connected to said latch and operable in one direction by the carrying medium to draw the latch into the shank and permit separation of the fastener and spring means normally acting upon the latch-operating piece to hold the latch in socket-engaging position.

5. A separable fastener stud including a socket-engaging part and means secured thereto providing a casing portion, said socket-engaging part having a shank provided with a contractible and expansible offset head for yieldable engagement with a socket, a latch presented through a slot at one side of said shank for cooperation with the offset head to lock the stud to a socket and latch-operating means contained in the casing portion and having a portion extending out through an opening in the casing and operable relative to the casing for moving the latch-operating means thereby drawing the latch within the shank.

6. A separable fastener stud including a socket-engaging part and means secured thereto providing a casing portion, said socket-engaging part having a headed shank contractible and expansible for engagement with a socket, said head being flush with the shank at one side and offset toward the opposite side to provide a shoulder at three sides of the shank, a latch presented through a slot at one side of said shank for cooperating with the head to lock the stud to a socket and latch-operating means contained in the casing portion and having a portion extending out through a slot in the casing and operable laterally relative to the casing for drawing the latch within the shank.

7. A separable fastener stud including a socket-engaging part and means secured thereto providing a casing portion, said socket-engaging part having a headed shank contractible and expansible for engagement with a socket, said head being flush with the shank at one side and offset toward the opposite side to provide a shoulder at three sides of the shank, a latch presented through a slot at that side of the shank adjacent to where the head is flush with the shank, a latch-operating finger located in the casing and extended through a slot in the side of the casing portion, and spring means in the casing portion normally pressing the said finger in the direction of the slot in the casing, said spring means, latch and latch-operating finger being provided as a single unit.

In testimony whereof, I have signed my name to this specification.

MOSES F. CARR.